(12) United States Patent
Vacura

(10) Patent No.: US 9,992,416 B2
(45) Date of Patent: Jun. 5, 2018

(54) REAL TIME ELECTRONIC VIDEO STABILIZATION

(71) Applicant: Motorola Mobility LLC, Chicago, IL (US)

(72) Inventor: Daniel Vacura, Chicago, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days. days.

(21) Appl. No.: 15/345,397

(22) Filed: Nov. 7, 2016

(65) Prior Publication Data

US 2018/0131873 A1    May 10, 2018

(51) Int. Cl.
*H04N 5/228*    (2006.01)
*H04N 5/232*    (2006.01)
*G06T 5/00*    (2006.01)

(52) U.S. Cl.
CPC ......... *H04N 5/23267* (2013.01); *G06T 5/001* (2013.01); *H04N 5/23293* (2013.01); *G06T 2210/22* (2013.01)

(58) Field of Classification Search
CPC ............ H04N 5/23267; H04N 5/23293; G06T 5/001; G06T 2210/22
USPC .............................. 348/208.1–208.8, 208.99
See application file for complete search history.

(56) References Cited

U.S. PATENT DOCUMENTS

2012/0189225 A1\* 7/2012 Li ...................... H04N 5/23212
382/260
2017/0034410 A1\* 2/2017 Yoo .................... H04N 5/23216

\* cited by examiner

*Primary Examiner* — Yogesh Aggarwal

(57) ABSTRACT

In various embodiments, an image stabilization system includes a dual-path, processing pipeline in which a first path serves as a stabilization path, and a second path serves as a preview path. An image signal processor produces a stream of image frames for each path. Frames that are received by the stabilization path undergo stabilization processing to produce post processed frames that are cropped in a manner that provides for visual stabilization. Frames that are received by the preview path are processed to provide a real-time preview while corresponding frames are processed by the stabilization path.

19 Claims, 5 Drawing Sheets

REAL TIME ELECTRONIC VIDEO STABILIZATION

BACKGROUND

Video stabilization is a video enhancement technology that seeks to remove unwanted motion from electronic videos. Unwanted motion can arise from unintended hand shaking motion, such as when a user holds a camera, as well as other sources. Video stabilization is typically performed by a video stabilization module that implements somewhat complex algorithms that can run on a computing device that is separate from the camera that produces the electronic video. The video stabilization module typically receives video frames from an image signal processor and processes the video frames to produce a stabilized video that can be played back for a user. Typically, the user is able to see the final stabilized video only after the video stabilization module has performed its stabilizing processing.

BRIEF DESCRIPTION OF THE DRAWINGS

Embodiments of real time electronic video stabilization are described with reference to the following Figures. The same numbers may be used throughout to reference like features and components that are shown in the Figures.

DETAILED DESCRIPTION

Overview

Figure 1:
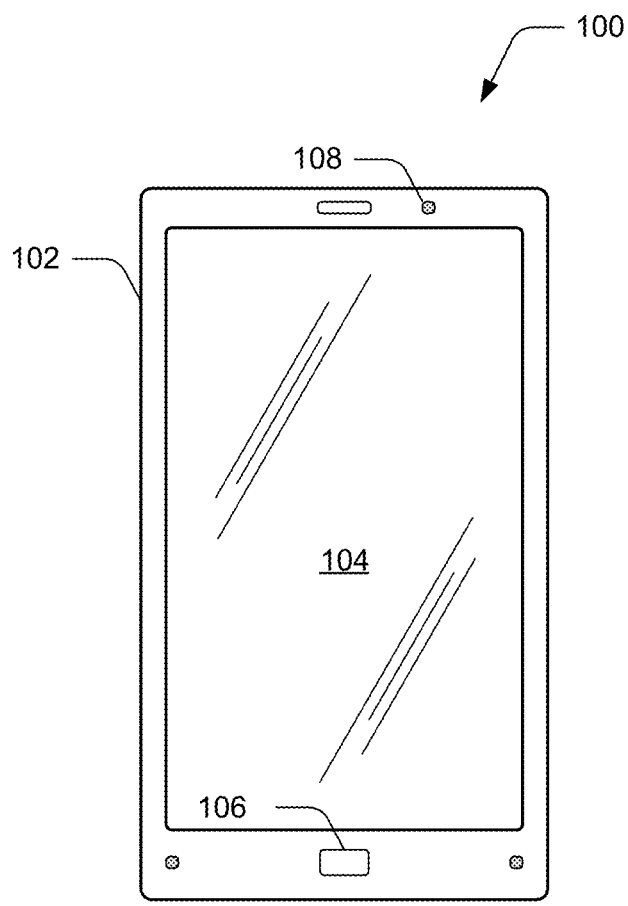
FIG. 1 illustrates an example mobile device in which embodiments of real time electronic video stabilization can be implemented.

In various embodiments, an image stabilization system includes a dual-path, processing pipeline in which a first path serves as a stabilization path, and a second path serves as a preview path. An image signal processor produces a stream of image frames for each path.

Frames that are received by the stabilization path are queued at a video stabilization module (VSTAB module), where the frames undergo stabilization processing to produce post processed frames that are cropped in a manner that provides for visual stabilization. The video frames can then be provided to an encoder for encoding in the usual way.

Frames that are received by the preview path are processed by a post process module. The post process module receives events from the video stabilization module that represent estimated processing data for individual frames. Estimated processing data can include, by way of example and not limitation, real-time crop data for individual frames, warping data, affine data, transformation coordinates data, and a variety of other processing data associated with a current or previous frames. That is, as the video stabilization module processes each frame that it receives, the stabilization module produces estimated processing data, such as real-time crop data. In the cropping scenario, the real-time crop data is processed in the preview path by the post process module. Each frame is dynamically cropped in accordance with the real-time crop data received from the video stabilization module. The cropped frame, along with other similarly cropped frames, is then provided as a preview to a display so that a user can immediately view a preview of the video as it is processed, in real time, by the image stabilization system. In the discussion that follows, real-time crop data is used as a basis of the discussion. It is to be appreciated, however, that other estimated processing data, such as the data mentioned above, can be utilized without departing from the spirit and scope of the claimed subject matter. The other estimated processing data can be used by itself or can be used in combination with other types of processing data.

That is, as the video stabilization module processes each frame that it receives, it develops real-time crop data for each frame. The stabilization module collects real-time crop data for multiple frames which it then uses for stabilization processing over the multiple frames. This provides for a very high degree of stabilization. At the same time, as the video stabilization module develops real-time crop data for each frame, each frame's real-time crop data is provided as an event to the post process module in the preview path. Each frame's real-time crop data is then used to make dynamic crop adjustments to each frame. The dynamically cropped-adjusted frames are then made available to a display to provide a preview. In some instances, the stabilized preview may not necessarily have the same degree of stabilization as the video emerging from the video stabilization module. However, for expediency in providing a generally immediate preview, processing each frame with its real-time crop data provides a sufficient degree of quality for a video preview. In this manner, the user can observe, in a generally real-time fashion, a very good approximation of what a completed stabilized video will look like.

In the discussion that follows, an operating environment is described in which the inventive embodiments can be employed. Following this, various embodiments for real time electronic video stabilization are described.

Operating Environment

FIG. 1 illustrates a handheld, mobile device generally at 100, that can be used in connection with the inventive embodiments described herein. Typical mobile devices include cellular telephones, push-to-talk (PTT) devices, smart phones, PDAs, and others. The mobile device 100 includes a body or housing 102 that contains a display 104 that can display content such as phone numbers, text messages, internet information, images, etc. The mobile device 100 also includes one or more switches 106 and multiple cameras, an example of which is shown at 108. The cameras can be disposed at any location on the front and back of the mobile device 100. Other input/output (I/O) devices such as microphones, wheels, joysticks, soft (software defined) or hard keys, touchscreens, speakers, antennas, and assorted I/O connections may be present in the mobile device but are not shown here.

Figure 2:
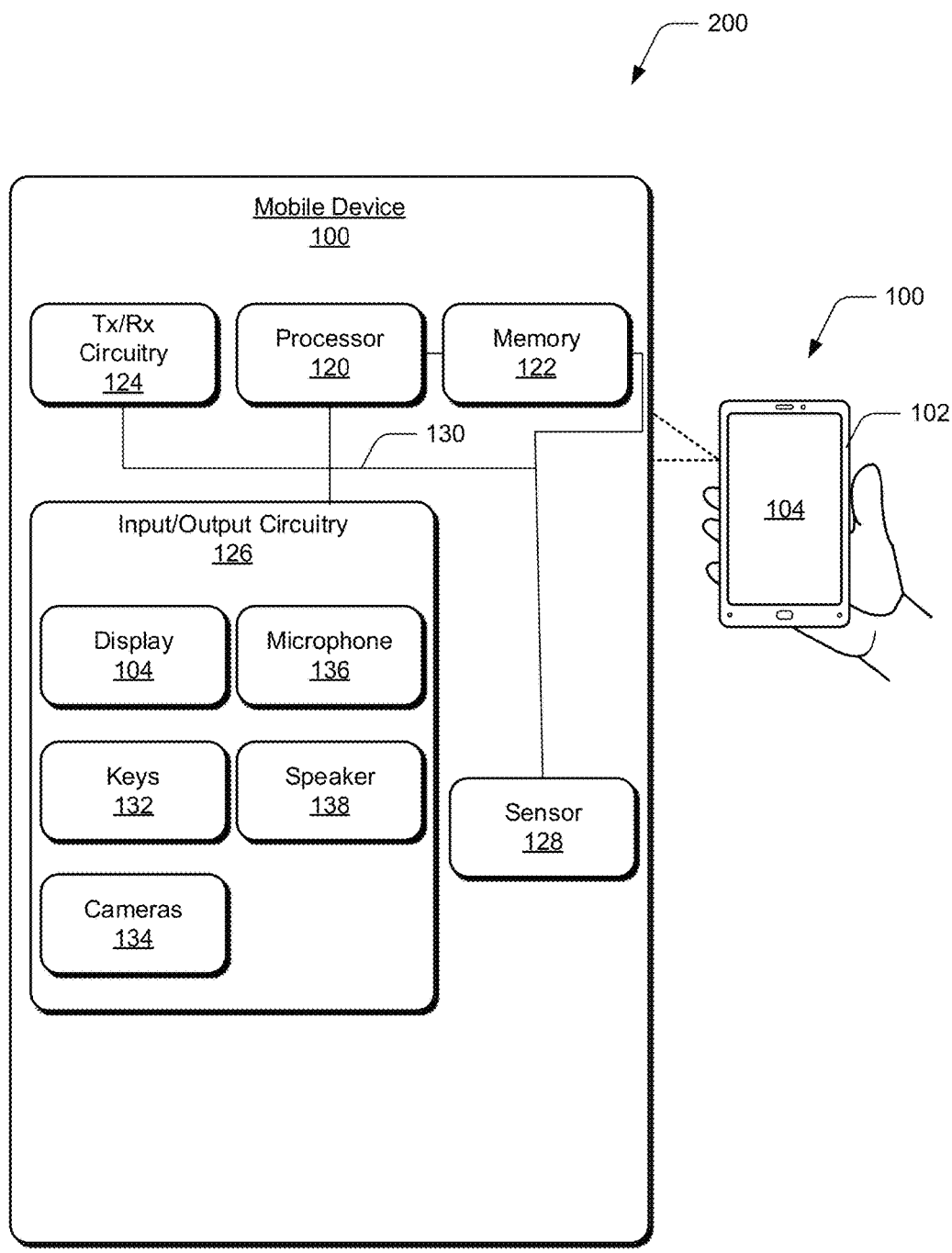
FIG. 2 illustrates an example components of the mobile device of FIG. 1 in accordance with one or more embodiments.

The mobile device 100 also contains internal components and circuitry that control and process information and elements of the mobile device 100. For example, as shown generally at 200 in FIG. 2, the mobile device 100 contains a processor 120, a memory 122, transmit/receive circuitry 124, input/output circuitry 126, and a sensor 128 that are connected by a system bus 130 that operatively couples various components to the processor 120. The I/O circuitry 126 contains circuitry that is connected to the display 104, keys 132, cameras 134, microphone 136, speaker 138, etc. The sensor 128 may be one or more accelerometer and/or one or more gyroscope, for example. The accelerometer and gyroscope can be used to determine attitude and motion of the device which, in turn, can be processed to stabilize video and the like, as will become apparent below.

In some embodiments, the sensor 128 is formed from a conventional microelectromechanical systems (MEMS) device. In other embodiments, the sensor 128 and one or more of the cameras 134 may be the same element. Multiple gyroscopes and/or accelerometers or a combination thereof may be used to obtain more accurate sensor results. Further, the sensor 128 (as other elements) may provide different functionalities dependent on the device mode (e.g., game, camera, navigation device, internet browser, etc.).

The memory 122 may be a conventional memory that is commercially available. The memory 122 may include random-access memory (RAM), read-only memory (ROM), flash memory and the like, that contain, for example, non-transitory computer-accessible media. The processor 120 executes computer programs stored on the computer-accessible media.

Mobile devices can be communicatively connected to the Internet via a wired or wireless connection in a manner well known in the art. Wired connections can be provided using, for example, a modem or Ethernet or similar network card connected to a local-area network (LAN) or a wide-area network (WAN) that itself is connected to the Internet via, for example, a Ti line. Wireless connections can be provided using WiFi or some other connection. The mobile devices typically operate on an operating system stored on the device.

Having considered an example operating environment, consider now embodiments in which real time electronic video stabilization can take place.

Example Real Time Electronic Video Stabilization

Figure 3:
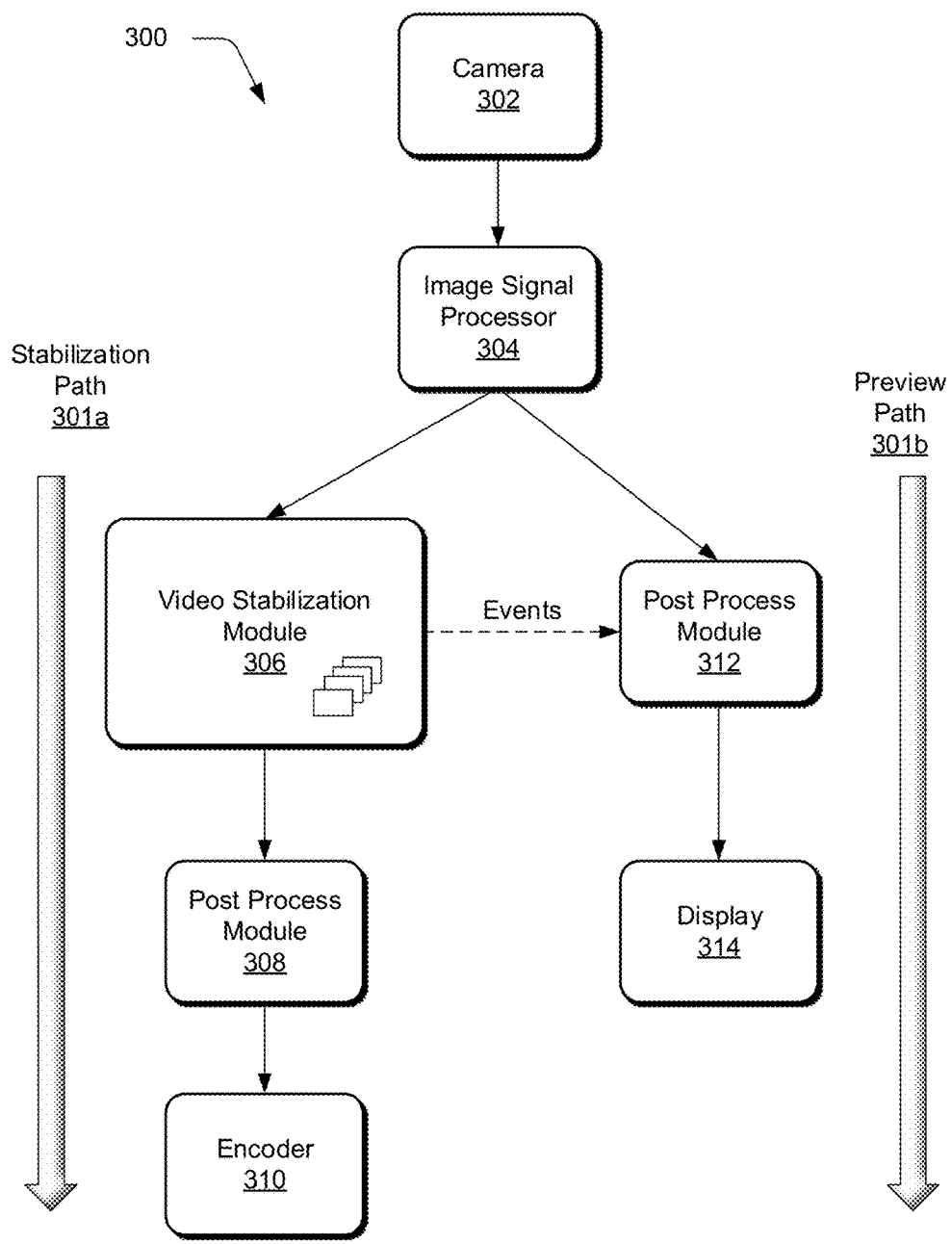
FIG. 3 illustrates an example image stabilization system in accordance with one or more embodiments.

FIG. 3 illustrates an example image stabilization system, in accordance with one or more embodiments, generally at 300. The image stabilization system 300 may be a stationary device such as a desktop personal computer or it may be a mobile device, such as a tablet, laptop computer, or cellular telephone. The image stabilization system can be implemented in any suitable hardware, software, firmware, or combination thereof. In some embodiments, the image stabilization system is implemented as a system-on-a-chip (SoC).

Image stabilization system 300 includes a dual-path, processing pipeline in which a first path 301a serves as a stabilization path, and a second path 301b serves as a preview path. Image stabilization system also includes a camera 302 and an image signal processor 304. Camera 302 produces raw video data composed of a series of successive image frames. The image signal processor 304 processes the raw video data to produce a stream of image frames for each path 301a, 301b. The image signal processor 304 can perform any suitable type of processing on the raw video data that is received from camera 302. This can include converting and formatting the data so that the data can be processed in parallel by the stabilization path 301a and the preview path 301b. Typically this processing can include bayer demosaic, color correction, gain, scaling and cropping.

The stabilization path 301a includes a video stabilization (VSTAB) module 306, a post process module 308, and an encoder 310. The preview path 301b includes a post process module 312 and a display 314.

The VSTAB module 306 can perform various functions to stabilize the video frames that it receives. That is, frames that are received by the VSTAB module 306 are queued (as diagrammatically indicated by the four rectangles inside the module 306) and undergo stabilization processing to produce post processed frames that are cropped in a manner that provides for visual stabilization. The VSTAB module 306 receives the video frames including a so-called "margin" for each frame. The margin represents a border associated with each video frame. The border results in a larger input size that is utilized in order to crop the video frames to reduce motion and alleviate motion judder artifacts.

To perform stabilization processing, the VSTAB module can include camera motion estimation functionality, camera stabilization functionality, and image compensation functionality.

The camera motion functionality estimates the camera's path of motion based, in part, on gyroscope and/or acceleration data that it receives. The camera motion functionality performs this function by estimating a global camera motion from successive frames that it receives and queues for processing.

The camera stabilization functionality stabilizes the camera motion and smoothes the curve of the camera motion. The camera stabilization functionality can do this by establishing an upper bound and a lower bound of the global camera motion and smoothing the curve of camera motion between the upper and lower bounds.

The image compensation functionality is configured to move a cropped window in successive frames based on the smooth camera path and upsample each cropped image to original resolution. But one way in which this functionality can be performed is described in U.S. Patent Application Publication No. 2015/0022677, the disclosure of which is incorporated by reference. In some instances, the cropped image may not need to be upsampled. Rather, a larger input may be input and then unneeded content can be cropped out. The cropped frames can then be provided to post process module 308 and encoded by encoder 310 in the usual way. The post processing module 308 can perform operations such as flip, rotate and resize operations. The post processing module 308 can also perform color space conversion operations to match what a particular target may require, as will be appreciated by the skilled artisan.

By virtue of building a queue of multiple frames in the VSTAB module 306, and processing the queue of multiple frames to provide predictive video stabilization, if one were to wait until the multiple frames are finished being processed by the VSTAB module in order to provide a preview, there would be a considerable and visually-discernible delay. This would result in a poor user experience. The preview path 301b and the manner in which it is employed greatly mitigates any visual delays associated with previewing video that is undergoing processing by the image stabilization system 300. This is because the user is provided with a preview of video frames before the frames are done being processed by the VSTAB module 306.

Specifically, the post process module 312 in preview path 301b receives video frames from the image signal processor 304. Each video frame that is received by the post process module 312 also includes a margin as noted above. Each frame is buffered and the post process module 312 waits to receive an update from the VSTAB module 306. That is, as the video stabilization module 306 processes each frame it receives in order to perform predictive video stabilization, the video stabilization module 306 develops video stabilization data, e.g., estimated processing data such as real-time estimated crop data, warping, affine, transformation coordinates data and the like. In the cropping scenario, this data essentially describes how to crop the frame and how to adjust the frame for the motion that the VSTAB module 306 predicts. Because all of the queued up frames in the video stabilization module 306 have not yet been processed, this information is not complete with respect to all of the multiple frames that reside at the video stabilization module. The information is, however, complete enough with respect to each individual frame to provide the information to the post process module 312 so that the post process module can make dynamic crop adjustments to each frame.

To provide this information to the post process module 312, the video stabilization module 306 creates events that include the information that the post process module 312 uses to perform dynamic crop adjustments on each frame. This permits the post process module 312 to perform field-of-view modifications for each frame that adjust each frame's field-of-view to provide a cropped frame. The information that is provided in each event can comprise any suitable type of information that can be used to permit dynamic crop adjustments to occur, as well as other estimated processing such as that mentioned above. In at least some embodiments, the information included in each event includes X and Y offsets that describe where a frame should be cropped. The information can also include a transformation matrix that describes transformations that are to be made.

When an event is received by the post process module 312, each corresponding frame is processed to provide a dynamically cropped adjustment. The frame is then sent to display 314 to provide an immediate preview. The display may be any suitable type of display including, by way of example and not limitation, flat panel display technology, such as an LED, LCD, plasma, or a projection screen.

That is, as the video stabilization module processes each frame that it receives, it develops estimated processing data, such as real-time crop data for each frame. The stabilization module collects the estimated processing data, e.g., the real-time crop data for multiple frames which it then uses for stabilization processing over the multiple frames. This provides for a very high degree of stabilization. At the same time, however, as the video stabilization module develops real-time crop data for each frame, each frame's real-time crop data is provided as an event to the post process module in the preview path. Each frame's real-time crop data is then used to make dynamic crop adjustments to each frame. The dynamically cropped-adjusted frames are then made available to display 314 to provide a preview. In some instances, the crop-adjusted preview may not necessarily have the same degree of stabilization or quality as the video emerging from the video stabilization module. However, for expediency in providing a generally immediate preview, processing each frame with its real-time crop data provides a sufficient degree of quality for a video preview. In this manner, the user can observe, in a generally real-time fashion, a very good approximation of what a completed stabilized video will look like.

Having considered an example image stabilization system in accordance with one or more embodiments, consider now example methods in accordance with one or more embodiments.

Example Methods

Example method 400 is described with reference to FIG. 4. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
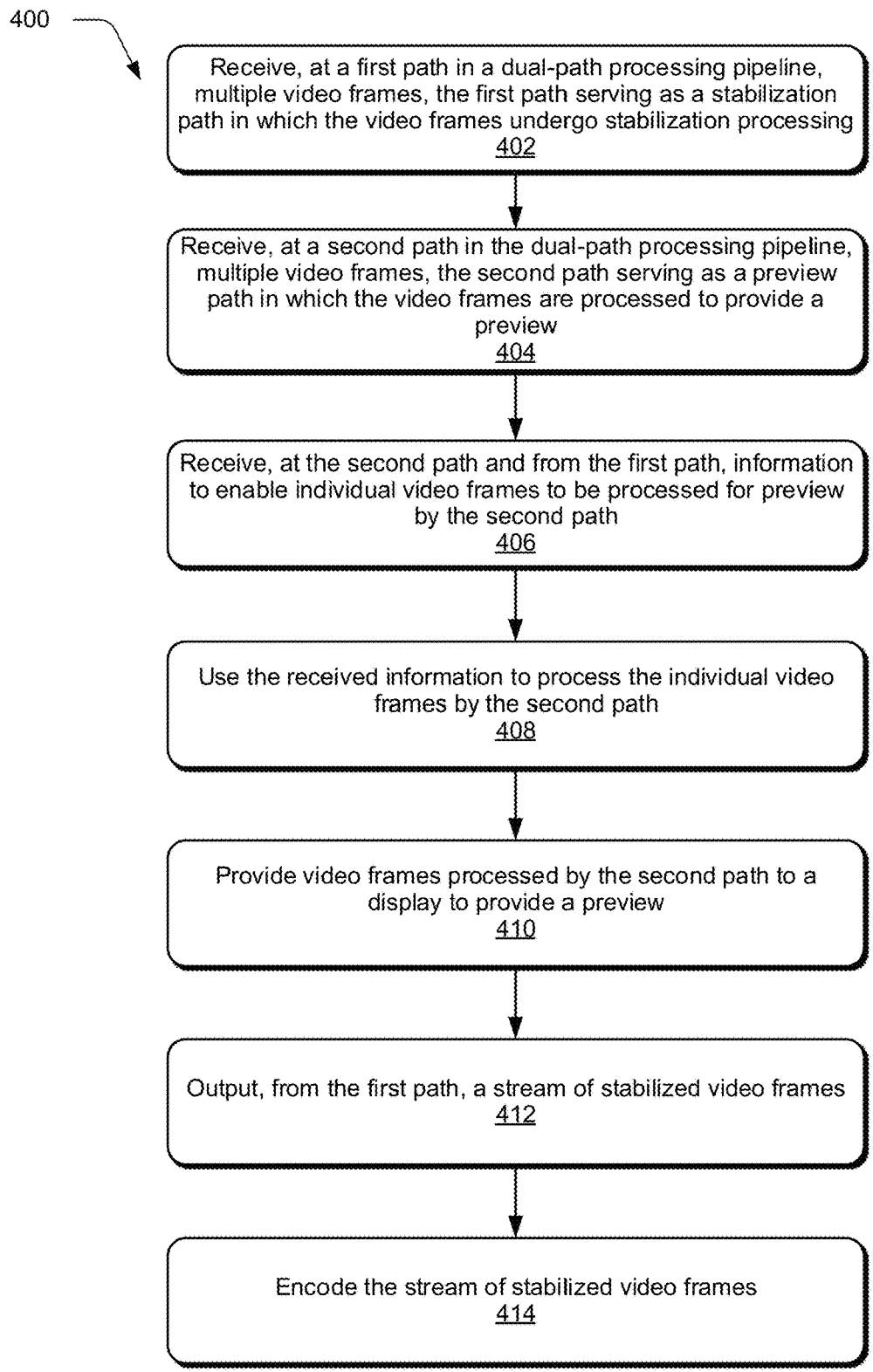
FIG. 4 is a flow diagram that describes operations in a method in accordance with one or more embodiments.

FIG. 4 illustrates example method 400 of real time electronic video stabilization as described herein. The order in which the method is described is not intended to be construed as a limitation, and any number or combination of the described method operations can be performed in any order to perform a method, or an alternate method.

At block 402, multiple video frames are received at a first path in a dual-path processing pipeline. In the illustrated and described embodiment, the first path serves as a stabilization path in which the video frames undergo stabilization processing. Any suitable type of stabilization processing can take place, examples of which are provided above. At block 404, multiple video frames are received at a second path in the dual-path processing pipeline. The second path serves as a preview path in which the video frames are processed to provide a preview. In the illustrated and described embodiment, the video frames that are processed by the second path are the same frames and correspond to those frames that are processed by the first path. In this example, however, frames that are processed by the first path are delayed because the frames are queued up and processed to enable predictive stabilization. Predictive stabilization utilizes a history of multiple frames to enable stabilization processing to take place. Frames that are processed by the second path, however, are not queued up in the manner in which the frames are queued up in the first path. Rather, frames that are processed by the second path are processed individually and in a manner that does not require the frames to be queued up.

At block 406, information from the first path is received at the second path. The information is configured to enable individual video frames to be processed by the second path for a preview. In various embodiments, the processing can include processing the frames by dynamically cropping the frames. In the illustrated and described embodiment, this information is received in the form of events that are communicated from the first path to the second path. Each event is associated with an individual video frame and contains processing data, such as dynamic crop adjustments to enable the second path to crop the corresponding frames. Any suitable type of information can be provided for enabling dynamic crop adjustments. In the illustrated and described embodiment, such information includes X and Y offsets that enable a frame to be cropped, and can also include a transformation matrix to enable transformations to be performed. At block 408, the information received from the first path is used by the second path to process the individual video frames so that the individual video frames can be previewed. Such processing can include cropping the individual video frames. This operation is performed while multiple frames are being processed by the first path in a stabilization process.

At block 410, video frames processed by the second path are provided to a display to provide a preview. That is, as each individual frame is processed by the second path, the frame once processed (e.g., cropped), is output to a display to provide a preview for user. At block 412, a stream of stabilized video frames is output from the first path and subsequently encoded at block 414.

The method just described and the embodiments described above improve upon the state of the art by providing a real-time preview of video while non-real-time stabilization processing is performed on the video. This enables the user to see, in a generally expeditious manner, what the video will look like once it is stabilized. This includes enabling the user to see how their video will look with correct cropped margins and other adjustments while the video undergoes non-real-time or off-line stabilization processing. This provides the user with somewhat immediate feedback without requiring the user to wait until the entire video stream has undergone stabilization processing.

Having considered various embodiments described above, consider now an example device that can be utilized to implement the described embodiments.

Example Device

Figure 5:
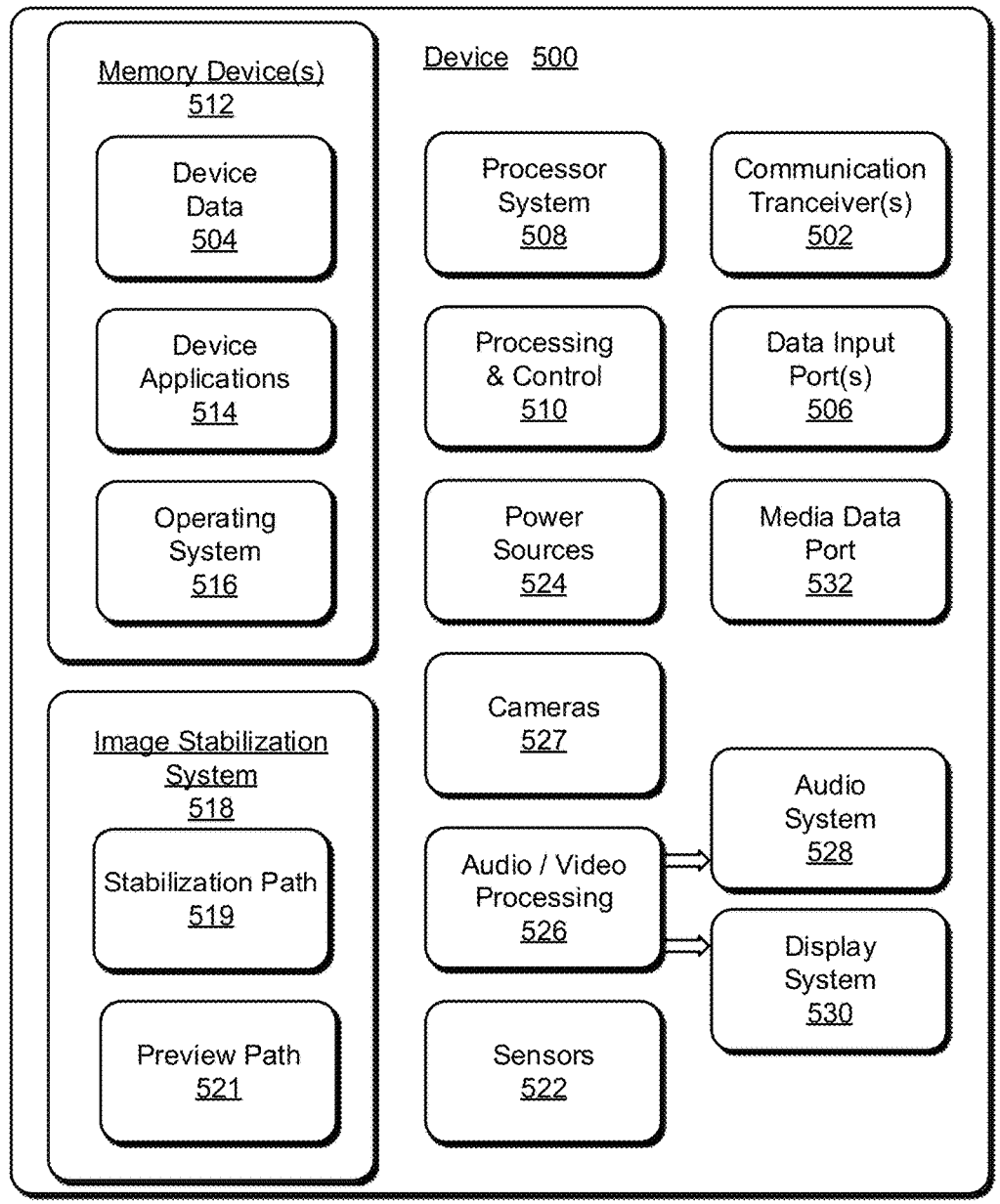
FIG. 5 illustrates various components of an example device that can implement embodiments of real time electronic video stabilization.

FIG. 5 illustrates various components of an example device 500 in which embodiments of real-time electronic video stabilization can be implemented. The example device 500 can be implemented as any of the devices described with reference to the previous figures, such as any type of client device, mobile phone, tablet, computing, communication, entertainment, gaming, media playback, and/or other type of electronic device.

The device 500 includes communication transceivers 502 that enable wired and/or wireless communication of device data 504 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternately or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on.

In addition, device 500 can include an image stabilization system 518 that includes a stabilization path 519 and a preview path 521 that operates as described above and below. The image stabilization system can be implemented in any suitable hardware, software, firmware or combination thereof. In at least some embodiments, the image stabilization system is implemented as a system-on-a-chip (SoC).

The device 500 can also include one or more device sensors 522, such as any one or more of an ambient light sensor, a proximity sensor, a touch sensor, an infrared (IR) sensor, accelerometer, gyroscope, and the like. The device 500 can also include one or more power sources 524, such as when the device is implemented as a mobile device. The power sources may include a charging and/or power system, and can be implemented as a flexible strip battery, a rechargeable battery, a charged super-capacitor, and/or any other type of active or passive power source.

The device 500 also includes an audio and/or video processing system 526 that generates audio data for an audio system 528 and/or generates display data for a display system 530, and multiple cameras 527. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 532. In implementations, the audio system and/or the display system are integrated components of the example device. Alternatively, the audio system and/or the display system are external, peripheral components to the example device.

Although the embodiments described above have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method, comprising:
   receiving multiple video frames at a first path in a dual-path processing pipeline, the first path serving as a stabilization path in which the video frames undergo stabilization processing;
   receiving multiple video frames at a second path in the dual-path processing pipeline, the second path serving as a preview path in which the video frames received at the second path are processed to provide a preview, the video frames received at the second path corresponding to the video frames received at the first path;
   receiving, at the second path, information from the first path, the information being configured to enable individual video frames received at the second path to be processed by the second path for preview;
   using, by the second path, the information received from the first path to process the individual video frames received at the second path for preview; and
   providing video frames processed by the second path to a display to provide a preview prior to the completion of a stabilization process of the first path.

2. The method as recited in claim 1, wherein said receiving information is performed responsive to the first path transmitting one or more events containing corresponding information to enable individual video frames to be cropped by the second path.

3. The method as recited in claim 1, wherein said receiving information is performed responsive to the first path transmitting one or more events containing corresponding information to enable individual video frames to be cropped by the second path, wherein each event is associated with an individual video frame.

4. The method as recited in claim 1, wherein said receiving information is performed responsive to the first path transmitting one or more events containing corresponding information to enable individual video frames to be cropped by the second path, wherein said information comprises X and Y offsets that enable a video frame to be cropped.

5. The method as recited in claim 1, wherein said using the information comprises using the information to crop the individual video frames while corresponding video frames are processed by the first path in a stabilization process.

6. The method as recited in claim 1 further comprising outputting a stream of stabilized video frames from the first path.

7. An image stabilization system comprising:
   a dual-path processing pipeline comprising:
      a first path serving as a stabilization path in which video frames received from an image signal processor undergo stabilization processing;
      a second path serving as a preview path in which video frames corresponding to video frames processed by the first path are processed to provide a preview prior to the completion of a stabilization process of the first path; and
      wherein the first path is configured to provide information to the second path to enable individual video frames to be processed by the second path for preview.

8. An image stabilization system as recited in claim 7, wherein the first path is configured to transmit one or more events containing corresponding information to enable the individual video frames to be cropped by the second path.

9. An image stabilization system as recited in claim 7, wherein the first path is configured to transmit one or more events containing corresponding information to enable the individual video frames to be cropped by the second path, wherein each event is associated with an individual video frame.

10. An image stabilization system as recited in claim 7, wherein the first path is configured to transmit one or more events containing corresponding information to enable the individual video frames to be cropped by the second path, wherein said information comprises X and Y offsets that enable a video frame to be cropped.

11. An image stabilization system as recited in claim 7, wherein the second path is configured to crop individual video frames while corresponding video frames are processed by the first path in the stabilization processing.

12. An image stabilization system as recited in claim 7, wherein the image stabilization system is embodied as a system-on-a-chip.

13. A computing device comprising:
   one or more processors; and
   an image stabilization system executable by the one or more processors comprising:
      a first path serving as a stabilization path in which video frames received from an image signal processor undergo stabilization processing;
      a second path serving as a preview path in which video frames corresponding to video frames processed by the first path are processed to provide a preview prior to the completion of a stabilization process of the first path; and
      wherein the first path is configured to provide information to the second path to enable individual video frames to be processed by the second path for preview.

14. The computing device as recited in claim 13, wherein the first path is configured to transmit one or more events containing corresponding information to enable the individual video frames to be cropped by the second path.

15. The computing device as recited in claim 13, wherein the first path is configured to transmit one or more events containing corresponding information to enable the individual video frames to be cropped by the second path, wherein each event is associated with an individual video frame.

16. The computing device as recited in claim 13, wherein the first path is configured to transmit one or more events containing corresponding information to enable the individual video frames to be cropped by the second path, wherein said information comprises X and Y offsets that enable a video frame to be cropped.

17. The computing device as recited in claim 13, wherein the second path is configured to crop individual video frames while corresponding video frames are processed by the first path in the stabilization processing.

18. The computing device as recited in claim 13, wherein the first path is configured to transmit one or more events containing corresponding information to enable the individual video frames to be cropped by the second path, wherein each event is associated with an individual video frame and wherein said information comprises X and Y offsets that enable a video frame to be cropped.

19. The computing device as recited in claim 13, wherein the second path is configured to crop individual video frames while corresponding video frames are processed by the first path in the stabilization processing, wherein the first path is configured to transmit one or more events containing corresponding information to enable the individual video frames to be cropped by the second path, wherein each event is associated with an individual video frame.

\* \* \* \* \*